(12) United States Patent
Jha et al.

(10) Patent No.: US 11,256,598 B2
(45) Date of Patent: Feb. 22, 2022

(54) AUTOMATED SELECTION OF PERFORMANCE MONITORS

(71) Applicant: International Business Machines Corporation, Armonk, NY (US)

(72) Inventors: Saurabh Jha, Urbana, IL (US); Amos A. Omokpo, Richmond, TX (US); Karthick Rajamani, Austin, TX (US); HariGovind Venkatraj Ramasamy, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 112 days.

(21) Appl. No.: 16/818,656

(22) Filed: Mar. 13, 2020

(65) Prior Publication Data

US 2021/0286699 A1 Sep. 16, 2021

(51) Int. Cl.
*G06F 11/34* (2006.01)
*G06F 17/18* (2006.01)
*G06F 9/54* (2006.01)
*G06N 20/00* (2019.01)

(52) U.S. Cl.
CPC ......... *G06F 11/3452* (2013.01); *G06F 9/542* (2013.01); *G06F 11/3476* (2013.01); *G06F 17/18* (2013.01); *G06N 20/00* (2019.01)

(58) Field of Classification Search
CPC .. G06F 11/3452; G06F 9/542; G06F 11/3476; G06F 17/18; G06N 20/00
USPC ........................................................ 702/182
See application file for complete search history.

(56) References Cited

U.S. PATENT DOCUMENTS

| | | | |
|---|---|---|---|
| 2003/0046380 A1* | 3/2003 | Steger | H04L 43/14 709/223 |
| 2013/0030761 A1 | 1/2013 | Lakshminarayan et al. | |
| 2018/0316707 A1 | 11/2018 | Dodson et al. | |
| 2019/0042353 A1 | 2/2019 | Ahad | |

(Continued)

OTHER PUBLICATIONS

Jha et al., Live Forensics for Distributed Storage Systems, Jul. 24, 2019, arXiv:1907.10203v1.

(Continued)

*Primary Examiner* — John H Le
(74) *Attorney, Agent, or Firm* — Garg Law Firm, PLLC; Rakesh Garg; Christopher Pignato

(57) ABSTRACT

An embodiment includes extracting statistical data associated with invocation of an application programming interface (API) from a log and using the statistical data to calculate a performance value and generate an aggregate dataset that combines the performance value with performance values associated with other invocations of the API. The embodiment includes calculating metric values for performance values for respective time intervals of a time period and calculating mean and standard deviation values of the metric values for the time period. The embodiment includes selecting the API as a candidate API and detecting a Customer Impacting Event (CIE) by applying a machine learning algorithm using monitored values associated with the candidate API during a time frame defined by a rolling window. The embodiment also includes automatically initiating a selected alert from among a plurality of alert options based at least in part on the monitored values associated with the CIE.

20 Claims, 6 Drawing Sheets

(56) References Cited

U.S. PATENT DOCUMENTS

2019/0245876 A1    8/2019  Faigon et al.
2020/0356229 A1*  11/2020  Pelloin .................... H04L 67/22
2021/0064516 A1*   3/2021  Gomez ............... G06F 11/3419

OTHER PUBLICATIONS

Huang et al., Capturing and Enhancing In Situ System Observability for Failure Detection, Usenix, 13th USENIX Symposium on Operating Systems Design and Implementation (OSDI '18), Oct. 8-10, 2018, https://www.usenix.org/conference/osdi18/presentation/huang.

Mell et al., The NIST Definition of Cloud Computing, National Institute of Standards and Technology, May 3, 2019.

* cited by examiner

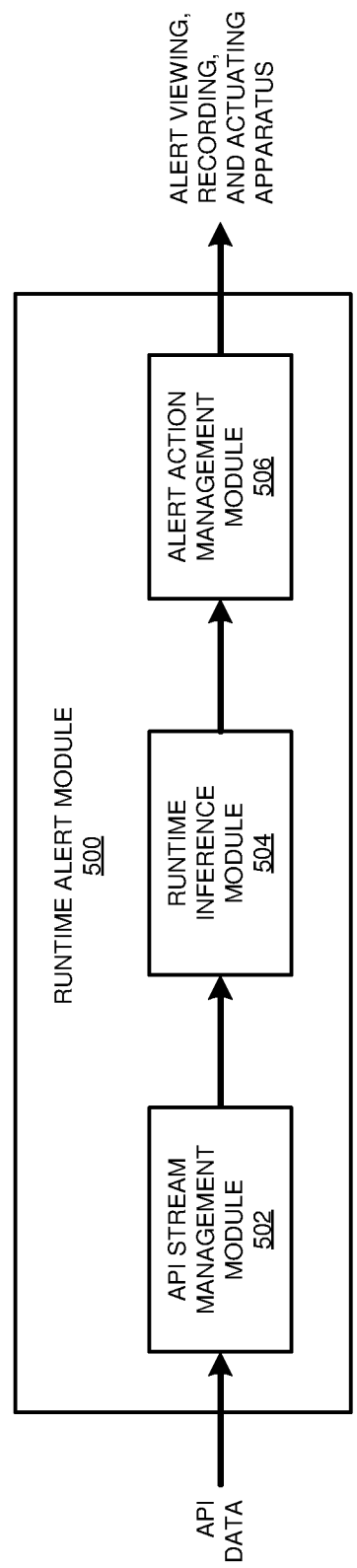

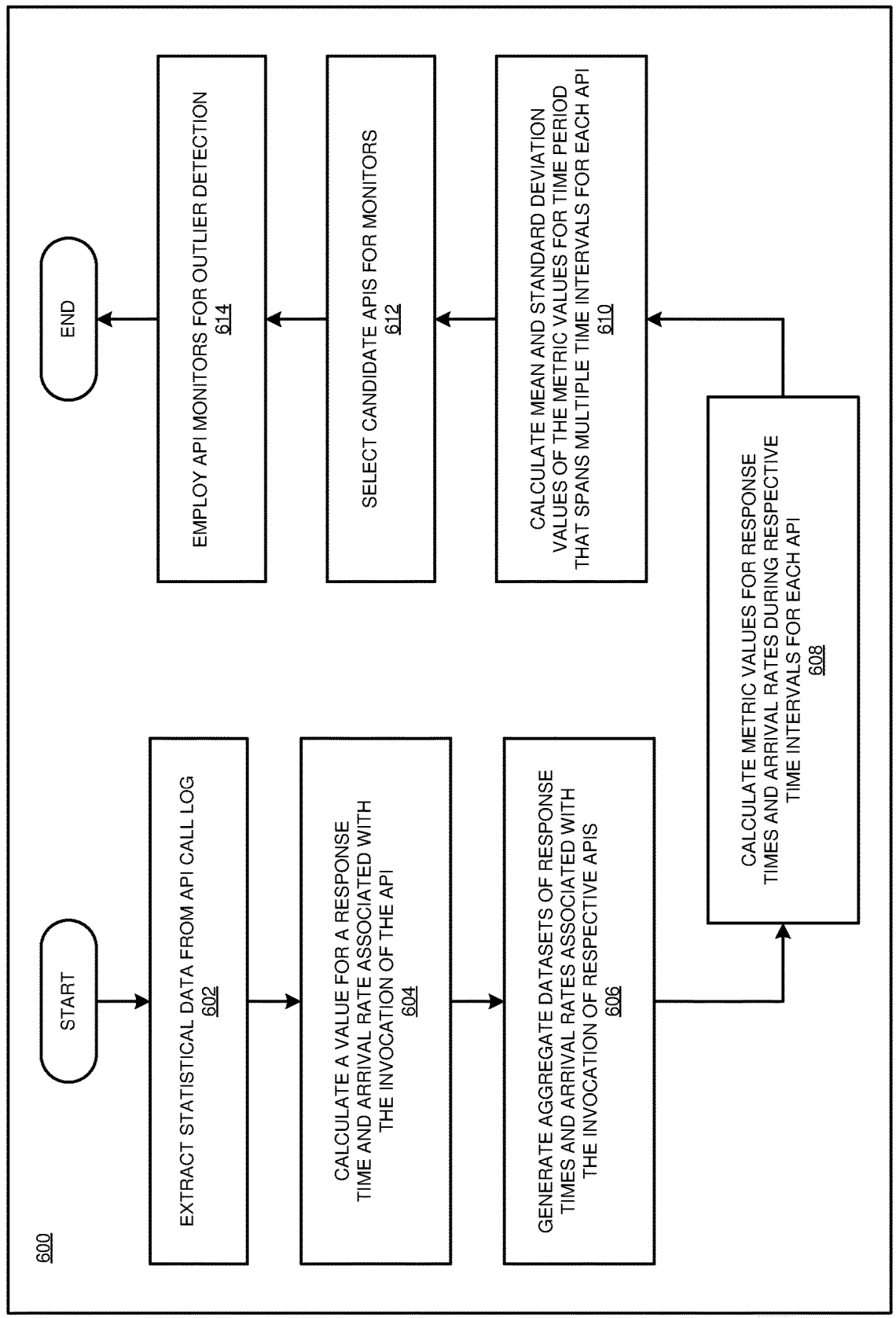

AUTOMATED SELECTION OF PERFORMANCE MONITORS

TECHNICAL FIELD

The present invention relates generally to a method, system, and computer program product for monitoring cloud services. More particularly, the present invention relates to a method, system, and computer program product for automated selection of performance monitors for cloud services.

BACKGROUND

Cloud computing allows business enterprises to quickly deploy Information Technology (IT) software and hardware computing resources and applications to service their customers without setting up and maintaining costly data centers or running and maintaining complex software applications. Instead, the business enterprises can focus on their core business and leave the operation and maintenance of the computing resources to the cloud computing providers. Cloud consumers may receive computing services from a cloud provider's data centers that include pools of computing resources such as servers, data storage, networks, and software applications. The cloud provider may offer these resources to the cloud consumers as on-demand and fee-based services. Cloud computing services are typically delivered to the consumers through a combination of private and public networks, such as company intranets and the Internet.

SUMMARY

The illustrative embodiments provide for automated selection of performance and reliability monitors. An embodiment includes extracting, by a processor, statistical data from an application programming interface (API) call log, the statistical data being associated with an invocation of an API by an application. The embodiment also includes calculating, by the processor, a performance value associated with the invocation of the API using the statistical data. The embodiment also includes generating, by the processor, an aggregate dataset that combines the performance value associated with the invocation of the API with performance values associated with respective previous invocations of the API. The embodiment also includes calculating, by the processor, metric values for respective time intervals of a time period, wherein the metric values are associated with performance values during the respective time intervals. The embodiment also includes calculating, by the processor, mean and standard deviation values of the metric values for the time period. The embodiment also includes selecting, by the processor, the API as a candidate API, the API being selected from among a plurality of APIs based at least in part on criteria involving performance values of the APIs. The embodiment also includes detecting, by the processor, a Customer Impacting Event (CIE) by applying a machine learning algorithm using monitored values associated with the candidate API during a time frame defined by a rolling window. The embodiment also includes, responsive to the detecting of the CIE, automatically initiating, by the processor, a selected alert from among a plurality of alert options based at least in part on the monitored values associated with the CIE. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 5 depicts a block diagram of a runtime alert module for automated selection of performance monitors in accordance with an illustrative embodiment; and FIG. 6 depicts a flowchart of an example process for automated selection of performance monitors in accordance with an illustrative embodiment.

DETAILED DESCRIPTION

Figure 1:
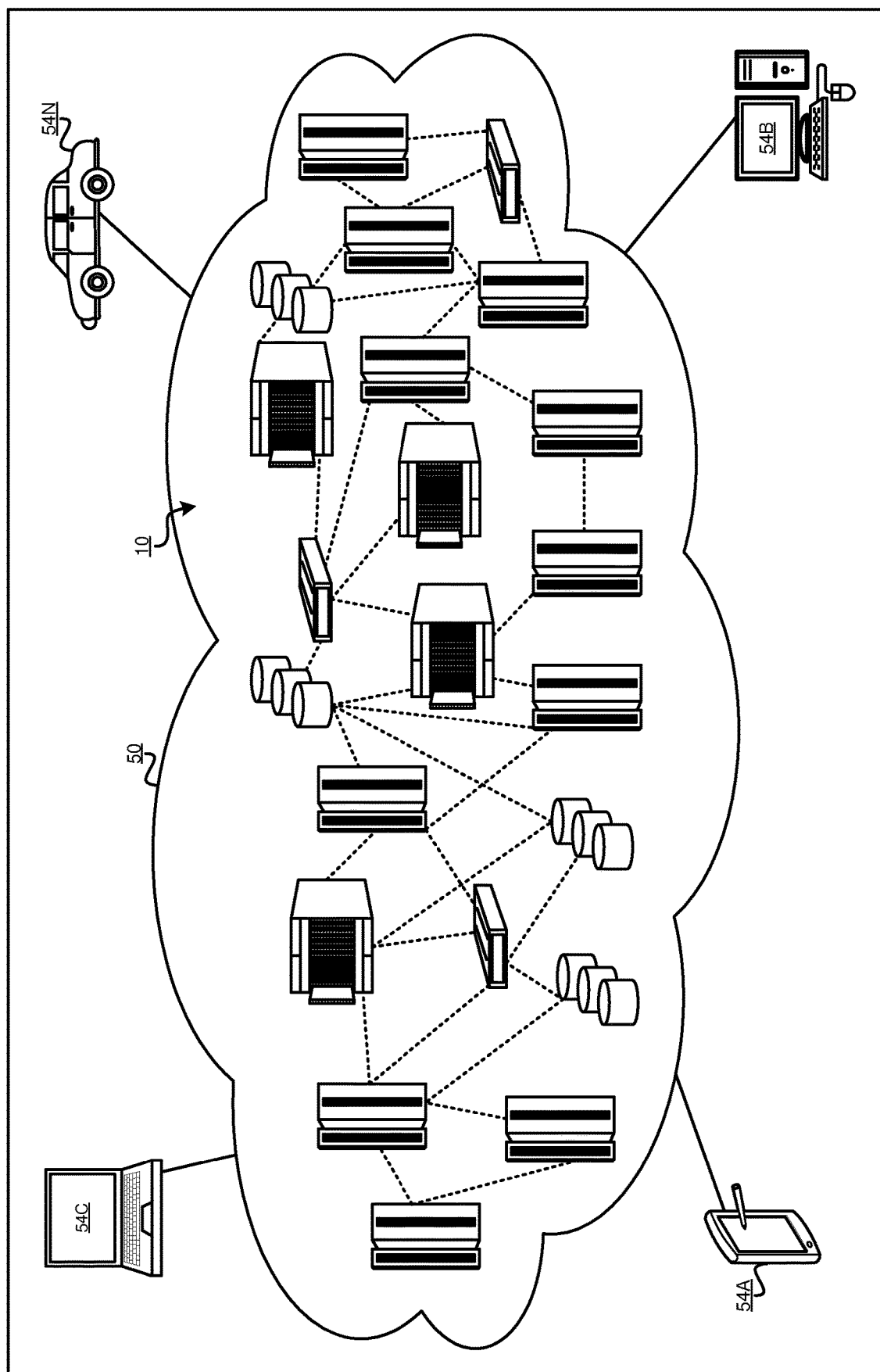
FIG. 1 depicts a cloud computing environment according to an embodiment of the present invention.

Cloud datacenters occasionally experience failures, outages and performance anomalies—referred to as Customer Impacting Events (CIEs)—that have the potential to degrade user experience. CIEs are sometimes difficult to detect as: 1) the CIEs are customer or service specific (i.e., only part of the system is unavailable under certain specific cases), 2) multiple monitors may lead to conflicting view of the health of the system leading to high-false positive rate, and 3) the reliability of data sources and monitors change over time. For example, consider a case where a cloud provider is measuring response time of a set of services as their key-performance indicator (KPI) to detect CIEs. However, such a method works great for detecting CIEs but a problem occurs when (a) the service designs change, (b) service itself is removed or (c) the system-scale changes.

The illustrative embodiments recognize that current approaches for monitoring distributed systems require creation of complex monitors, which are very difficult and time-consuming to create, or are not practical for cloud systems due to the extreme complexity and of such systems and due to different parts of the cloud components being managed by different teams. For example, different components of a cloud system may be managed by different teams within the cloud provider or by third parties.

The illustrative embodiments used to describe the invention generally address and solve the above-described problems by using raw system logs generated due to user-activity on the system (which enables capturing of CIEs) to automatically identify and create reliable monitors. The monitors may change over time based on their reliability characteristics and/or their unavailability (due to fast changing cloud system design). Once the monitors are automatically identified and created, the monitors can be used with statistical methods (e.g., median-based outlier detection methods), probabilistic graphical models (e.g., factor graphs as proposed in Kaleidoscope) or deep-learning approaches (e.g., LSTM) to detect CIEs.

The illustrative embodiments can be implemented as part of a cloud service that exposes multiple services (such as cloud provisioning) via APIs to users. Public or private users can use these APIs to use these services. Illustrative embodiments passively listen to API calls and the logs generated by the calls to automatically discover and create monitors for detecting CIEs. Some embodiments include building profiles for each API and recording response times for related API requests. Some embodiments use these profiles to identify which API calls can form reliable monitors for detecting CIEs.

In some embodiments, an application for automated selection of performance monitors extracts statistical data from an API call log. In some such embodiments, the application extracts statistical data associated with invocations of APIs. For example, in some embodiments, the application extracts statistical data that includes data representative of response time data and/or arrival rate data. As another example, in some embodiments, the application extracts statistical data that includes data for calculating response time data and/or arrival rate data.

The term "arrival rate" as used herein refers to an API request arrival rate $\lambda = A/T$ where A is a number of API request arrivals and T is a time interval. The term "response time" as used herein refers to an API request response time, which is a period of time from when a system submits an API request until that system receives a response to the API request.

In some embodiments, an application for automated selection of performance monitors calculates performance values associated with the invocation of APIs using the statistical data. In some such embodiments, the application uses the statistical data to calculate response times associated with invocations of APIs. In some such embodiments, the application uses the statistical data to calculate arrival rates associated with invocations of APIs.

In some embodiments, an application for automated selection of performance monitors generates an aggregate dataset that combines the performance values associated with invocations of APIs. In some such embodiments, the application generates an aggregate dataset that combines response times associated with invocations of APIs. In some such embodiments, the application generates an aggregate dataset that combines arrival rates associated with the invocation of APIs.

In some embodiments, an application for automated selection of performance monitors calculates metric values for respective time intervals of a time period. In some such embodiments, the metric values are associated with performance values during the respective time intervals. For example, in some embodiments, the metric values are associated with response times during the respective time intervals. As another example, in some embodiments, the metric values are associated with arrival rates during the respective time intervals.

In some embodiments, an application for automated selection of performance monitors calculates metric values that include one or more of a median metric and one or more percentile metrics, such as a 95th percentile value and/or a 99th percentile value. Percentiles show the point at which a certain percentage of observed values occur. For example, the 95th percentile is the value which is greater than 95% of the observed values. Percentiles are therefore useful for detecting outlier values. For example, in some embodiments, the 0.13th and 99.87th percentiles represent three standard deviations from the mean, so any data that falls outside three standard deviations is considered an outlier value. In some embodiments, then a range of percentiles calculated, they are used to estimate the data distribution and determine if the data includes an outlier value. In some embodiments, is used for calculating the metric values for respective time intervals of a time period.

In some embodiments, each metric value is associated with a specific performance value and is calculated using API data for a single API during a single time interval. For example, in some embodiments, an application for automated selection of performance monitors calculates a first metric value using response time data for a first API during a first time interval, and calculates a second metric value using arrival rate data for the first API during the first time interval. In some such embodiments, the application calculates a third metric value using response time data for a second API during the first time interval, and calculates a fourth metric value using arrival rate data for the second API during the first time interval. In some embodiments, the application calculates a fifth metric value using response time data for the first API during a second time interval, and calculates a sixth metric value using arrival rate data for the first API during the second time interval. In some such embodiments, the application calculates a seventh metric value using response time data for the second API during the second time interval, and calculates an eight metric value using arrival rate data for the second API during the second time interval.

In some embodiments, an application for automated selection of performance monitors calculates mean and standard deviation values of the metric values for a time period that includes one or more of the time intervals. For example, in some embodiments, the time period includes thirty time intervals, and the application calculates the mean of the thirty metric values (one for each of the thirty time intervals) and calculates the standard deviation of the thirty metric values.

In some embodiments, the application selects one or more APIs as a candidate APIs from among the plurality of system APIs. In some embodiments, the application selects one or more APIs as a candidate APIs based at least in part on criteria involving the performance values of the APIs. In some embodiments, the application selects one or more APIs as a candidate APIs according to one or more criteria or rules, such as:

(1) Arrival rate of the API is among the highest arrival rates of the system APIs to ensure that there are enough measurements to do outlier detection, which in some embodiments is detected using known methods of estimating gaussian behavior using the law of large numbers.

(2) The standard deviation of the metrics is not be greater than the mean of the metric to ensure that the load generated by an API-call is roughly the same in every call.

(3) The ratio ρ between mean arrival rate y and the mean response time μ times the number of replicas c per cloud service API according to Expression (1) below should be less than 1.

$$\rho = \frac{\Upsilon}{(c \cdot \mu)} \quad (1)$$

The APIs in general is serviced with adequate resources, and so any deviation or outlier behaviors may be indicative of failures.

In some embodiments, the application generates new data structures from the API data to be used as monitors for detecting CIEs. In some embodiments, the new monitor data structures include mean and standard deviation values and/or the metric values for each of the candidate APIs. In some embodiments, the monitor data structures include data that allows for detection of outlier values indicative of CIEs.

In some embodiments, the application receives realtime API call data and detects a CIE by applying a machine learning algorithm using monitored values associated with the candidate APIs during a time frame defined by a rolling window. In some embodiments, responsive to the detecting of the CIE, the application automatically initiates a selected alert from among a plurality of alert options based at least in part on the monitored values associated with the CIE.

In some embodiments, the application includes a neural network that uses an unsupervised learning form of machine learning in which the neural network attempts to train itself using unlabeled data. In such embodiments, the machine learning algorithm uses API call data as a training dataset that includes input data without any associated output data. In some embodiments, the neural network learns groupings within the unlabeled input and determine how individual inputs are related to the overall dataset. In some embodiments, the neural network performs anomaly detection, which allows the identification of outlier data points in an input dataset that deviate from the normal patterns of the data.

In some embodiments, the detected CIEs are designated according to a rolling time window, so that the data values considered part of a population or subpopulation (and the associated counts thereof) are based on when they occurred. For example, only data values that have been generated in the past d days may be part of the rolling time window, and thus the API data used for determining an anomaly is based on recent data rather than all of the generated data for the cloud service. A rolling window for signal anomaly scores provides a baseline for what "normal" operations in the API look like (e.g., what the last month's use patterns are).

In some embodiments, the application includes a data stream management system (DSMS) that is also referred to as a real time database and is designed to manage real-time API data streams. The DSMS provides API uses call data for outlier detection to detect CIEs by applying a machine learning algorithm using monitored values associated with the candidate API during a time frame defined by a rolling window. In some embodiments, the monitored values comprise response time values and arrival rate values.

In some embodiments, when the application detects a CIE, the application responds to detecting the CIE by transmitting data indicative of the detection of the CIE to initiate a selected alert from among a plurality of alert options based at least in part on the monitored values associated with the CIE. In some embodiments, the plurality of alert options include an outage alert and a performance alert. In some such embodiments, the application determines whether the data indicative of the detection of the CIE includes an unusually low value for arrival rate indicating a likely outage or includes an unusually high value for response time and/or arrival rate indicating a likely performance issue.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures.

For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
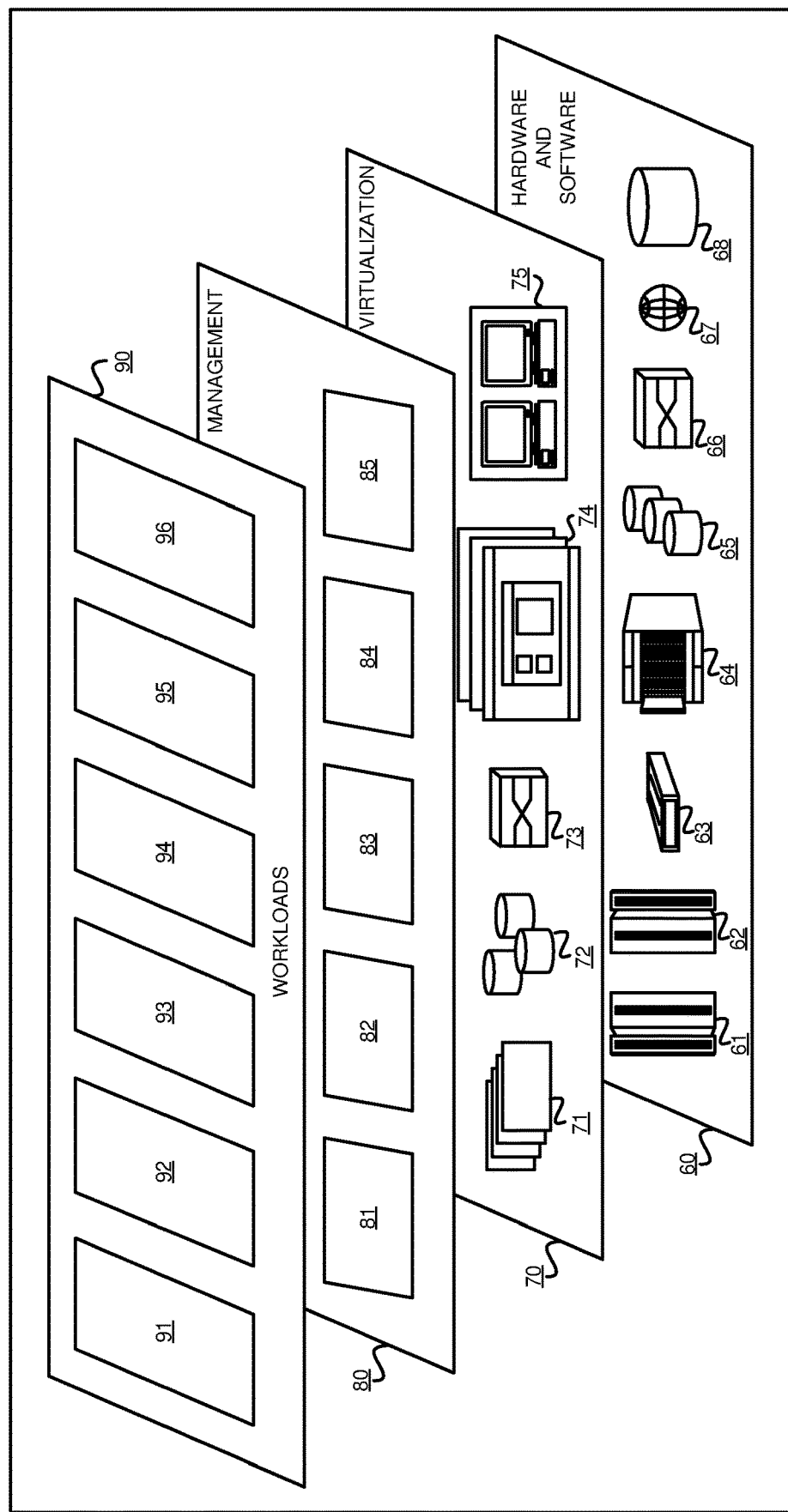
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and performance monitoring 96.

Figure 3:
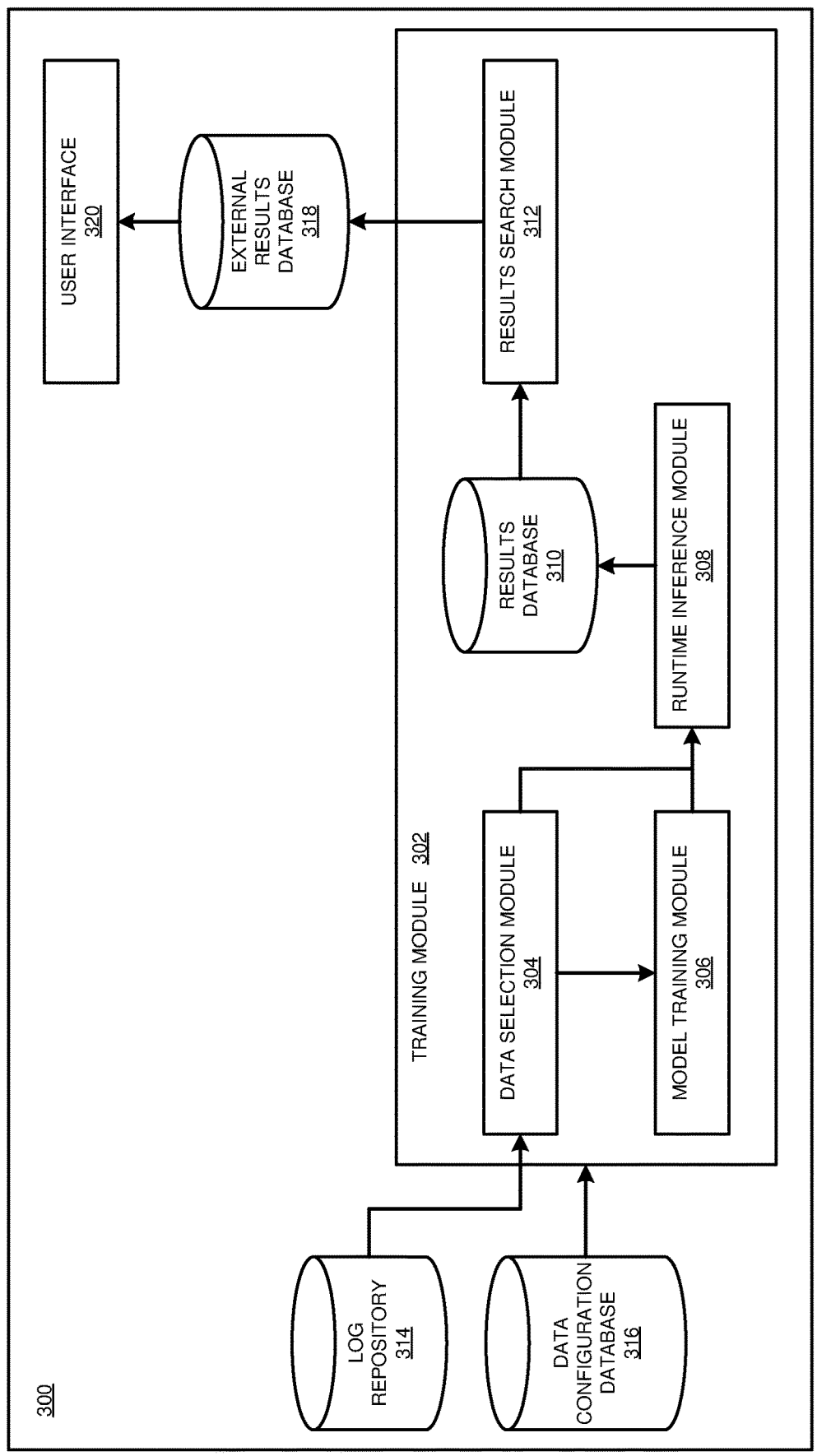
FIG. 3 depicts a block diagram of an example configuration for automated selection of performance monitors in accordance with an illustrative embodiment.

With reference to FIG. 3, this figure depicts a block diagram of an example application 300 for automated selection of performance monitors in accordance with an illustrative embodiment. In the illustrated embodiment, the application 300 includes a training module 302. In a particular embodiment, application 300 is an example of application 105A/105B of FIG. 1.

In the illustrated embodiments the training module 302 includes a data selection module 304, a model training module 306, a runtime inference module 308, a results database 310, and a results search module 312. The illustrated embodiment also includes a log repository 314 in communication with the data selection module 304a data configuration database 316 in communication with the training module 302, an external results database 318 in communication with the results search module 312, and a user interface 320 in communication with the external results database 318. In alternative embodiments, the application 300 and training module 302 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In some embodiments, the application 300 is implemented with a cloud-provider that exposes multiple services via APIs to users and maintains an API log in the log repository 314 that captures and stores data regarding API calls. In some embodiments, the data selection module 304 extracts statistical data from the API log on the log repository 314. In some embodiments, the data selection module 304 extracts statistical data that includes response time data and arrival rate data. In some embodiments, the data selection module 304 then automatically selects APIs to be candidate APIs that are used as performance monitors according to one or more rules or criteria. In some embodiments, the data selection module 304 extracts the statistical data and uses the data for an offline analysis to select candidate APIs.

In some embodiments, a model training module 306 receives performance values associated with the candidate APIs and uses a machine learning algorithm to learn performance values that are outliers and are therefore indicative of a high likelihood of a CIE. In alternative embodiments, the model training module 306 uses statistical methods (e.g., median-based outlier detection methods), probabilistic graphical models (e.g., factor graphs) or deep-learning approaches (e.g., an artificial recurrent neural network (RNN) architecture such as Long short-term memory (LSTM)).

In some embodiments, a runtime inference module 308 receives performance values associated with the candidate APIs and uses an unsupervised machine learning algorithm to continuously fine-tune the outlier values of the candidate APIs. For example, in some embodiments, the runtime inference module 308 receives performance values that include response time and arrival rate data for the candidate APIs and uses an unsupervised machine learning algorithm to continuously fine-tune the threshold values indicative of a CIE.

In some embodiments, the application stores output from the model training module 306 and runtime inference module 308 in a results database 310. In some embodiments, the application 300 allows a user to use a user interface 320 issue commands to a results search module 312 to search the results database 310. In some embodiments, the results search module 312 responds to search commands from the user interface 320 by searches the results database 310 and storing the search results in an external results database 318. In some embodiments, the external results database 318 is accessible to the user via the user interface 320. In some embodiments, the results database 310 stores data from the model training module 306 and the runtime inference module 308 as structured and/or unstructured data. In some embodiments, the results database 310 stores data from the model training module 306 and the runtime inference module 308 as structured data according to data structure instructions stored in a data configuration database 316. In some embodiments, the model training module 306 and the runtime inference module 308 format data according to data structure instructions stored in a data configuration database 316 and provide the structured data to the results database 310. In some embodiments, the results search module 312 searches structured data and/or the unstructured data in the results database 310 according to commands received from the user interface 320.

Figure 4:
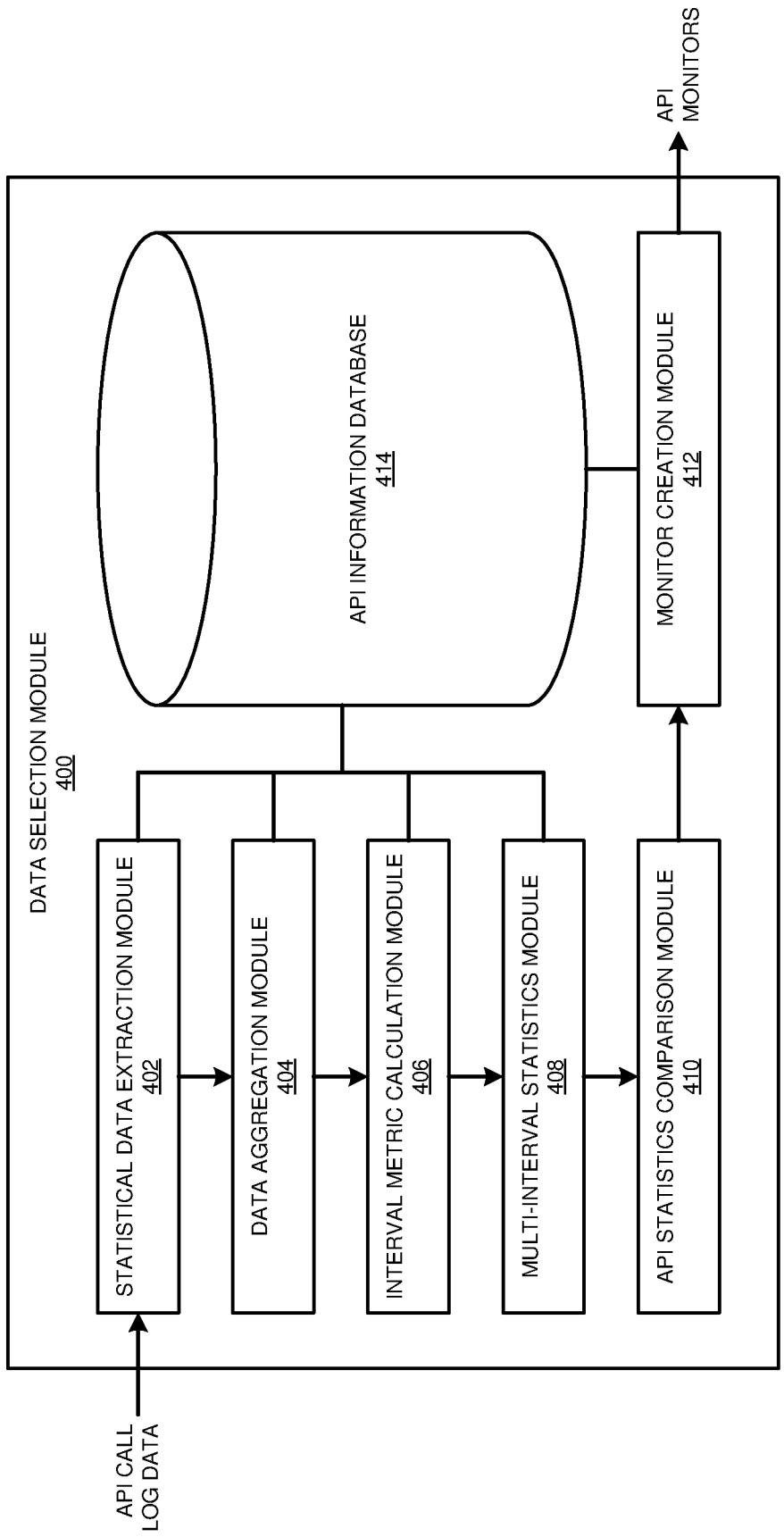
FIG. 4 depicts a block diagram of an example configuration for data selection for automated selection of performance monitors in accordance with an illustrative embodiment.

With reference to FIG. 4, this figure depicts a block diagram of a data selection module 400 in accordance with an illustrative embodiment. In a particular embodiment, data selection module 400 is an example of data selection module 304 of FIG. 3.

In the illustrated embodiment, the data selection module 400 receives API call log data and automatically outputs one or more API monitors. In some embodiments, the data selection module 400 receives the API call log data that includes statistical data from an API log. In some embodiments, the data selection module 400 extracts desired statistical data, for example response time data and/or arrival rate data, and automatically selects one or more candidate APIs from among APIs associated with the API call log data. In some embodiments, the data selection module 400 selects the one or more candidate APIs for use as one or more respective API monitors.

In some embodiments, the data selection module 400 includes a statistical data extraction module 402, a data aggregation module 404, an interval metric calculation module 406, a multi-interval statistics module 408, an API statistics comparison module 410, and a monitor creation module 412. In some embodiments, the data selection module 400 includes an API information database 414 that facilitates sharing of data among the various modules of the data selection module 400. In alternative embodiments, the data selection module 400 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In some embodiments, the statistical data extraction module 402 extracts statistical data from the API call log data. In some embodiments, the statistical data extraction module 402 extracts the statistical data associated with invocation of APIs. In some embodiments, the statistical data extraction module 402 extracts statistical data that includes response time data and arrival rate data associated with invocation of APIs. In some embodiments, the statistical data extraction module 402 extracts statistical data and uses the extracted data to calculate performance values associated with the invocation of APIs. For example, in some embodiments, the statistical data extraction module 402 extracts statistical data and uses the extracted data to calculate performance values such as response times and arrival rates associated with the invocation of APIs.

In some embodiments, the data aggregation module 404 generates an aggregate dataset that combines performance values received from the statistical data extraction module 402. In some embodiments, the interval metric calculation module 406 receives the aggregate dataset from the data aggregation module 404 and calculates metric values for respective time intervals of a time period. In some embodiments, the time intervals are equal time intervals of the time period. In some embodiments, the interval metric calculation module 406 calculates a metric values for respective time intervals and respective APIs. In some embodiments, the interval metric calculation module 406 calculates one or more of a median value, a 95th percentile value, and a 99th percentile value as a metric value.

In some embodiments, the multi-interval statistics module 408 calculates mean and standard deviation values from the metric values of the time intervals to determine mean and standard deviation values over the entire time period. As a non-limiting example, in an embodiment, the time period is a 30-minute time period that includes thirty 1-minute time intervals, the interval metric calculation module 406 calculates 30 metric values (i.e. one per time interval) per API for the 30-minute time period, and, for each API, the multi-interval statistics module 408 calculates a mean value of the thirty metric values and a standard deviation value of the thirty metric values. The 30-minute time period and 1-minute time intervals are described only as non-limiting examples, and any desired amounts of time can be used in actual implementations of the described embodiments.

In some embodiments, the API statistics comparison module 410 selects one or more APIs as a candidate APIs from among the plurality of system APIs. In some embodiments, the API statistics comparison module 410 selects one or more APIs as a candidate APIs based at least in part on criteria involving the performance values of the APIs. In some embodiments, the API statistics comparison module 410 selects one or more APIs as a candidate APIs according to one or more criteria or rules, such as:

(1) Arrival rate of the API is among the highest arrival rates of the system APIs to ensure that there are enough measurements to do outlier detection, which in some embodiments is detected using known methods of estimating gaussian behavior using the law of large numbers.

(2) The standard deviation of the metrics is not be greater than the mean of the metric to ensure that the load generated by an API-call is roughly the same in every call.

(3) The ratio ρ between mean arrival rate y and the mean response time μ times the number of replicas c per cloud service API according to Expression (1) above (and reproduced below) should be less than 1.

$$\rho = \frac{\Upsilon}{(c \cdot \mu)} \quad (1)$$

The APIs in general is serviced with adequate resources, and so any deviation or outlier behaviors may be indicative of failures.

In some embodiments, the monitor creation module 412 receives the candidate APIs selected by the API statistics comparison module 410 and generates new data structures from the API data to be used as monitors for detecting CIEs. In some embodiments, the new monitor data structures include mean and standard deviation values calculated by the multi-interval statistics module 408 and/or the metric values calculated by the interval metric calculation module 404 for each of the candidate APIs. In some embodiments, the monitor data structures include data that allows for detection of outlier values indicative of CIEs.

With reference to FIG. 5, this figure depicts a block diagram of a runtime alert module 500 in accordance with an illustrative embodiment. In a particular embodiment, runtime alert module 500 is an example of runtime inference module 308 of FIG. 3.

In the illustrated embodiment, the runtime alert module 500 receives realtime API call data and detects a CIE by applying a machine learning algorithm using monitored values associated with the candidate APIs during a time frame defined by a rolling window, and, responsive to the detecting of the CIE, automatically initiates a selected alert from among a plurality of alert options based at least in part on the monitored values associated with the CIE. In some embodiments, the runtime alert module 500 includes an API stream management module 502, a runtime inference module 504, and an alert action management module 506. In alternative embodiments, the runtime alert module 500 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In some embodiments, the API stream management module 502 includes a data stream management system (DSMS) that is also referred to as a real time database and is designed to manage real-time API data streams. The API stream management module 502 provides API call data related to the candidate APIs to the runtime inference module 504. In some embodiments, the runtime inference module 504 uses outlier detection to detects a CIE by applying a machine learning algorithm using monitored values associated with the candidate API during a time frame defined by a rolling window. In some embodiments, the monitored values comprise response time values and arrival rate values.

In some embodiments, when the runtime inference module 504 detects a CIE, the runtime inference module 504 responds to detecting the CIE by transmitting data indicative of the detection of the CIE to the alert action management module 506. In some embodiments, the alert action management module 506 automatically initiates a selected alert from among a plurality of alert options based at least in part on the monitored values associated with the CIE received from the runtime inference module 504. In some embodiments, the plurality of alert options include an outage alert and a performance alert. In some such embodiments, the alert action management module 506 determines whether the data indicative of the detection of the CIE includes an unusually low value for arrival rate indicating a likely outage or includes an unusually high value for response time and/or arrival rate indicating a likely performance issue. In some such embodiments, the alert action management module 506 automatically initiates a selected outage or performance alert by issuing alert signals for alerting and user and/or triggering actions in other connected systems.

With reference to FIG. 6 this figure depicts a flowchart of an example process 600 for automated selection of performance monitors in accordance with an illustrative embodiment. In a particular embodiment, the data selection module 400 carries out the process 600.

In an embodiment, at block 602, the process extracts statistical data from an API call log. At block 604, the process calculates a value for a response time and arrival rate associated with the invocation of the API. At block 606, the process generates aggregate datasets of response times and arrival rates associated with the invocation of respective APIs. At block 608, the process calculates metric values for response times and arrival rates during respective time intervals for each API. At block 610, the process calculates mean and standard deviation values of the metric values for time period that spans multiple time intervals for each API. At block 612, the process selects candidate APIs for monitors. At block 614, the process employs API monitors for outlier detection.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
deploying a plurality of application programming interfaces (APIs) in a cloud computing infrastructure;
extracting, by a processor, statistical data from an API call log, the statistical data being associated with an invocation of an API by an application;
calculating, by the processor, a performance value associated with the invocation of the API using the statistical data;
generating, by the processor, an aggregate dataset that combines the performance value associated with the invocation of the API with performance values associated with respective previous invocations of the API;
calculating, by the processor, metric values for respective time intervals of a time period, wherein the metric values are associated with performance values during the respective time intervals;
calculating, by the processor, mean and standard deviation values of the metric values for the time period;
selecting, by the processor, the API as a candidate API, the API being selected from among the plurality of APIs based at least in part on criteria involving performance values of the APIs, wherein the criteria comprise (i) an arrival rate of the candidate API is within a band of highest arrival rates for the plurality of APIs, (ii) a standard deviation of a metric for the candidate API is not greater than a mean of the metric for the API, and (iii) a ratio $\rho$ between a mean arrival rate $\lambda$ for the candidate API and a mean response time, $\mu$ for the candidate API times a number of replicas c for the candidate API according to Expression $\rho=\lambda/c\cdot\mu$ is less than 1;
detecting, by the processor, a Customer Impacting Event (CIE) by applying a machine learning algorithm using monitored values associated with the candidate API during a time frame defined by a rolling window; and
responsive to the detecting of the CIE, automatically initiating, by the processor, a selected alert from among a plurality of alert options based at least in part on the monitored values associated with the CIE.

2. The computer implemented method of claim 1, wherein the statistical data includes response time data and arrival rate data.

3. The computer implemented method of claim 1, wherein the extracting further comprises extracting statistical data from the API call log associated with invocation of a plurality of APIs, the plurality of APIs including said API.

4. The computer implemented method of claim 1, wherein the calculating of a performance value comprises calculating a response time.

5. The computer implemented method of claim 1, wherein the calculating of a performance value further comprises calculating an arrival rate.

6. The computer implemented method of claim 1, wherein a type of metric used for calculating the metric values is selected from the group consisting of a median value, a 95th percentile value, and a 99th percentile value.

7. The computer implemented method of claim 1, wherein the time intervals include a plurality of equal time intervals.

8. The computer implemented method of claim 1, wherein the machine learning algorithm provides an indication of monitored values that are outlier values indicative of the CIE.

9. The computer implemented method of claim 1, wherein the monitored values comprise response time values and arrival rate values.

10. The computer implemented method of claim 1, wherein the plurality of alert options include an outage alert and a performance alert.

11. A computer program product for automated selection of performance and reliability monitors, the computer program product comprising a computer readable storage medium having program instructions embodied therewith, the program instructions executable by a processor to cause the processor to perform operations comprising:
deploying a plurality of application programming interfaces (APIs) in a cloud computing infrastructure;
extracting, by a processor, statistical data from an API call log, the statistical data being associated with an invocation of an API by an application;
calculating, by the processor, a performance value associated with the invocation of the API using the statistical data;
generating, by the processor, an aggregate dataset that combines the performance value associated with the invocation of the API with performance values associated with respective previous invocations of the API;
calculating, by the processor, metric values for respective time intervals of a time period, wherein the metric values are associated with performance values during the respective time intervals;

calculating, by the processor, mean and standard deviation values of the metric values for the time period;

selecting, by the processor, the API as a candidate API, the API being selected from among the plurality of APIs based at least in part on criteria involving performance values of the APIs, wherein the criteria comprise (i) an arrival rate of the candidate API is within a band of highest arrival rates for the plurality of APIs, (ii) a standard deviation of a metric for the candidate API is not greater than a mean of the metric for the API, and (iii) a ratio ρ between a mean arrival rate λ for the candidate API and a mean response time μ for the candidate API times a number of replicas c for the candidate API according to Expression p=λ/c·μ is less than 1;

detecting, by the processor, a CIE by applying a machine learning algorithm using monitored values associated with the candidate API during a time frame defined by a rolling window; and responsive to the detecting of the CIE, automatically initiating, by the processor, a selected alert from among a plurality of alert options based at least in part on the monitored values associated with the CIE.

12. The computer program product of claim 11, wherein the stored program instructions are stored in a computer readable storage device in a data processing system, and wherein the stored program instructions are transferred over a network from a remote data processing system.

13. The computer program product of claim 11, wherein the stored program instructions are stored in a computer readable storage device in a server data processing system, and wherein the stored program instructions are downloaded over a network to a remote data processing system for use in a computer readable storage device associated with the remote data processing system, further comprising:

metering use of the computer usable code associated with the request; and generating an invoice based on the metered use.

14. The computer program product of claim 11, wherein the statistical data includes response time data and arrival rate data.

15. The computer program product of claim 11, wherein a type of metric used for calculating the metric values is selected from the group consisting of a median value, a 95th percentile value, and a 99th percentile value.

16. The computer program product of claim 11, wherein the plurality of alert options include an outage alert and a performance alert.

17. A computer system comprising a processor and one or more computer readable storage media, and program instructions collectively stored on the one or more computer readable storage media, the program instructions executable by the processor to cause the processor to perform operations comprising:

deploying a plurality of application programming interfaces (APIs) in a cloud computing infrastructure;

extracting, by a processor, statistical data from an API call log, the statistical data being associated with an invocation of an API by an application;

calculating, by the processor, a performance value associated with the invocation of the API using the statistical data;

generating, by the processor, an aggregate dataset that combines the performance value associated with the invocation of the API with performance values associated with respective previous invocations of the API;

calculating, by the processor, metric values for respective time intervals of a time period, wherein the metric values are associated with performance values during the respective time intervals;

calculating, by the processor, mean and standard deviation values of the metric values for the time period;

selecting, by the processor, the API as a candidate API, the API being selected from among the plurality of APIs based at least in part on criteria involving performance values of the APIs, wherein the criteria comprise (i) an arrival rate of the candidate API is within a band of highest arrival rates for the plurality of APIs, (ii) a standard deviation of a metric for the candidate API is not greater than a mean of the metric for the API, and (iii) a ratio ρ between a mean arrival rate λ for the candidate API and a mean response time μ for the candidate API times a number of replicas c for the candidate API according to Expression p=λ/c·μ is less than 1;

detecting, by the processor, a CIE by applying a machine learning algorithm using monitored values associated with the candidate API during a time frame defined by a rolling window; and responsive to the detecting of the CIE, automatically initiating, by the processor, a selected alert from among a plurality of alert options based at least in part on the monitored values associated with the CIE.

18. The computer system of claim 17, wherein the statistical data includes response time data and arrival rate data.

19. The computer system of claim 17, wherein a type of metric used for calculating the metric values is selected from the group consisting of a median value, a 95th percentile value, and a 99th percentile value.

20. The computer system of claim 17, wherein the plurality of alert options include an outage alert and a performance alert.

* * * * *